No. 681,830. Patented Sept. 3, 1901.
J. J. LAWLER.
STEAM TRAP.
(Application filed Nov. 30, 1900.)
(No Model.)

WITNESSES:
Franklin Brown
William K. Peters

INVENTOR
James J. Lawler,
BY
Emil F. Gennert
ATTORNEY

THE NORRIS PETERS CO., PHOTO-LITHO., WASHINGTON, D. C.

UNITED STATES PATENT OFFICE.

JAMES J. LAWLER, OF MOUNT VERNON, NEW YORK.

STEAM-TRAP.

SPECIFICATION forming part of Letters Patent No. 681,830, dated September 3, 1901.

Application filed November 30, 1900. Serial No. 38,239. (No model.)

*To all whom it may concern:*

Be it known that I, JAMES J. LAWLER, a citizen of the United States, and a resident of Mount Vernon, in the county of Westchester and State of New York, have invented certain new and useful Improvements in Steam-Traps, of which the following is a specification.

My invention relates to improvements in steam-traps in which an open float is made use of to make the trap operative, the float being inclosed in a cast-metal casing comprised of two halves, having abutting flanges which when bolted together with packing between the flanges forms a steam and water tight joint, the objects being, first, to provide a steam-trap which will have a comparatively large capacity in the float and body, hence a greater holding and discharging capacity over traps of the same cubic measurements, but of different construction; second, to construct a trap in which the packing at the joint of the casing-halves will always be covered by water; third, to facilitate the removal of the valve without separating the casing or body, and, fourth, to simplify and cheapen cost of construction and maintenance.

Figure 1:
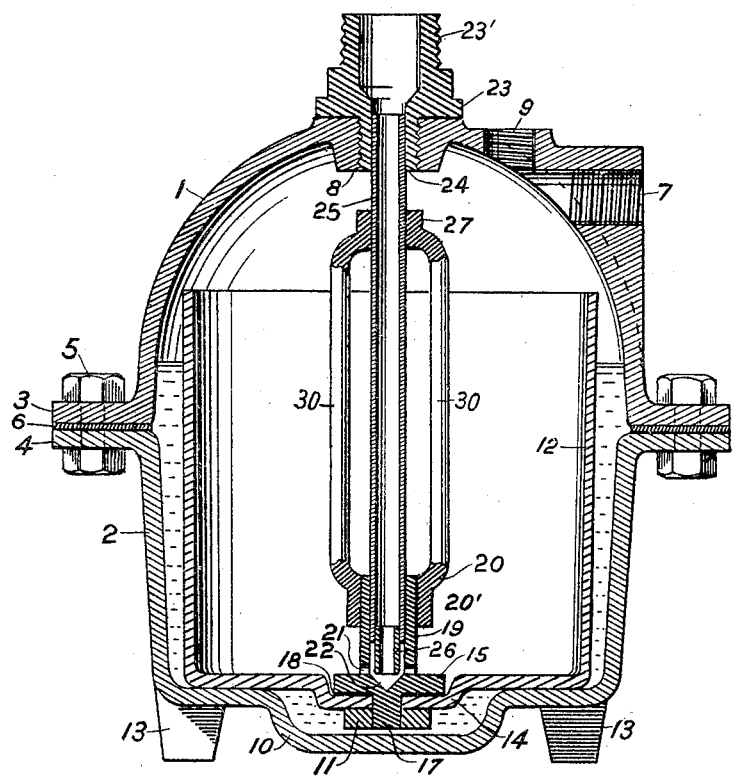
Figure 2:
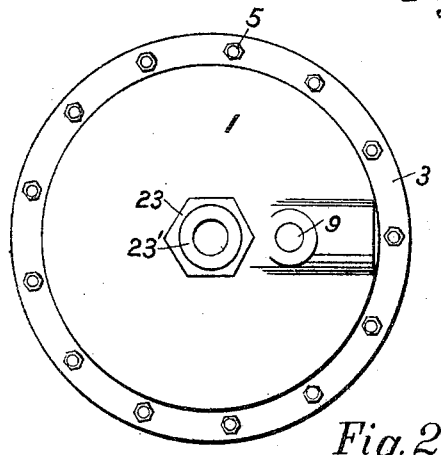
Figure 3:
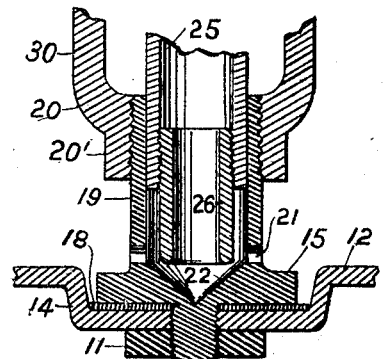

In the accompanying drawings, which form part of this specification, Figure 1 is a sectional view of a steam-trap embodying my improvement, the valve being shown open. Fig. 2 is a plan view, on a reduced scale, of Fig. 1; and Fig. 3 shows detail of valve construction enlarged.

Similar numbers of reference refer to similar parts in the several views.

The top and lower casings, respectively, 1 and 2, which form the body of the steam-trap, have a flange 3 and 4, respectively, which abut, and through which bolts 5 are passed at equidistant points, a suitable packing 6 being interposed between the flanges to insure a steam and water tight joint. As will be seen in Fig. 1, this joint is about midway between the top and bottom casings, and there being no bosses or lugs to interfere with the placing of the bolts around the flanges the bolts can be put as close together as may be desired. An inlet-port 7 is provided near the top of the dome-shaped upper casing 1, through which steam and water of condensation enter the body.

8 is the outlet-port.

9 is a hole into which a petcock or air-valve may be screwed.

10 is a well or round depression in the lower case 2, into which a nut 11 on the float 12 enters, as will be more fully hereinafter described.

13 represents legs on which the trap stands. The float 12 is cylindrical in shape, having a bottom which is depressed in the center 14, into which the valve-body 15 fits, the upper surface of the valve-body and inner bottom of float being on a horizontal line. The body 15 is held in place by a nut 11, which screws down on the threaded stud 17, which passes through a hole in the float. Packing 18, interposed between float and valve-body, makes a water-tight joint at that point. The valve-body 15 has a tubular extension 19, which screws into the base 20' of the float-guide 20. The tubular extension is perforated with a series of holes 21. The valve-seat 22 has the shape of an inverted cone and is situated below the line of the inside of float-bottom, as shown. Into the outlet-port 8 a fitting 23 is screwed, having a threaded upper part 23', adapted for connecting with steam-pipe.

24 is a male extension which is screwed in the outlet-port, the fitting being provided with a central opening throughout its length. In the lower part of this opening a tube 25 is screwed, which tube extends down into the tubular part 19 of the valve-body.

26 is the valve, which consists of a tube somewhat smaller in diameter than the tube 25 into which it is screwed. I prefer to make the lower edge of the tube 26 where it strikes the valve-seat rounding, so as to have a small area to bear on. The tube 25 should fit easily in the tubular extension 19, upon which it slides freely but not loosely. The float-guide 20 is a single piece of casting and consists of an annular ring at top 27 and one at bottom 20', connected by two members 30. The opening in the upper ring 27 admits tube 25, upon which it slides vertically, thus keeping the guide central. The opening in the lower ring is tapped for the reception of the tubular extension 19 of valve-body, the openings in the guide being on a straight vertical line with center of valve-seat. This construction insures the valve in the bottom of the float being operated in a perfectly vertical line when the float is raised or lowered in the usual way, as the accumulation of water of condensation varies in the trap. The float-guide touching only at its top and bottom rings, the friction is reduced to a minimum.

Such being the construction, the operation is as follows: As the water enters the trap through the inlet-port 7 it accumulates in the bottom and sides of the lower casing, thus raising the float 12 and the valve-body 15 and guide 20 and closing the valve. As the water of condensation continues to accumulate it rises up within the casing of the trap until it covers the packing 6 and flows over into the float, thereby depressing it and opening the valve in the bottom thereof. The accumulated water is then expelled by the steam in the casing, which forces it upward through the holes 21 in the tubular extension of the valve, and thence through the valve and tube 25 and the outlet-fitting 22. The operation is then repeated.

It will be seen in Fig. 1 that the bottom of the float touches the bottom of the lower casing of the trap; also, that the valve-seat is below the bottom line of the inside of the float. This construction causes the water of condensation to be entirely expelled from the interior of the float, which can be made heavier than in the ordinary trap, because there is no remnant of water left in bottom to be carried upward during the operation of the trap, and when the weight of the float, its guide, and valve-body is accurately determined in relation to the buoyancy of the complete float the trap can be so adjusted that in its operation the float will require a movement of only one-eighth of an inch. The water within the casing is always above the packing 6, so that it is never affected by the steam and the possibility of its being burned or blown out is slight. The water being of a lower temperature than the steam, the packing remains cooler than when it is exposed to the action of steam, and as the packing is not in the path of either water or steam it is much more durable than the packing used in steam-traps of ordinary construction, in which the packing is near the top or cover. The holes 21 in tubular extension of the valve-body act as a strainer and prevent any foreign matters from entering the valve. If it is desired to examine the valve, the outlet-fitting is unscrewed and withdrawn, carrying with it the tube 25 and valve 26. It can be replaced by reversing this operation. By having the flanges near the middle of the body the cases are much stronger for use on high-pressure systems, and there being no lugs or bosses within the plane of these flanges the bolts for holding the casing together can be placed as closely together as may be desired.

Having fully described my invention, what I claim as new, and desire to secure by Letters Patent, is—

1. A steam-trap, comprising a casing formed by connecting two members together, an inlet-port formed in the top side wall of the upper member and an outlet-port in the center of the top member, a tube secured in said outlet-port and depending into the casing, a valve carried at the lower end of said tube, a float-guide mounted upon said tube above the valve, and a float connected to the lower end of said guide.

2. A steam-trap, comprising a casing, an upper member of said casing being provided with an inlet-port, and an outlet-port, at substantially right angles to each other, a float slidably mounted in said casing, and a valve in said float near its bottom to control the outlet-port.

3. A steam-trap, comprising a casing, inlet and outlet ports provided in the upper portion of the casing, an inverted conical concaved valve-seat carried by the float in the bottom thereof, a float slidably mounted in said casing, and a valve mounted upon said seat to control the outlet-port.

4. A steam-trap, comprising a casing having a depression in its bottom and inlet and outlet ports near and in its top, a tube connected to the outlet-port and extending downward into the casing, a guide mounted upon said tube, a float provided with a depression in its bottom connected to the guide, and a valve to control the lower open end of the tube.

5. A steam-trap, comprising a casing formed by the connection of two members, a float slidably mounted in said casing, an inverted conical concaved valve-seat carried by the float in the bottom thereof, and a tubular valve mounted upon said seat to control the outlet-port.

Signed at New York, in the county of New York and State of New York, this 14th day of November, A. D. 1900.

JAMES J. LAWLER.

Witnesses:
 WILLIAM G. SHERRER,
 FRANKLIN BROWN.